United States Patent Office 3,561,924
Patented Feb. 9, 1971

3,561,924
PROCESS FOR THE PREPARATION OF RUTHENIUM CARBONYL
John Paton Candlin, Runcorn, England, assignor to Imperial Chemical Industries Limited, London, England, a corporation of Great Britain
No Drawing. Filed Mar. 14, 1968, Ser. No. 712,953
Int. Cl. C01g 55/00
U.S. Cl. 23—203                              9 Claims

ABSTRACT OF THE DISCLOSURE

A process for the preparation of tri-ruthenium dodecacarbonyl is performed by reacting a liquid solution of a ruthenium salt, an alkali metal or alkaline earth metal compound of an organic acid or of an enolizable compound with carbon monoxide and hydrogen. Typically temperatures between 100° and 250° C. and up to 300 atmospheres of pressure are used. The tri-ruthenium dodecacarbonyl is extracted from the reaction products.

---

This invention relates to a process for the production of triruthenium dodecacarbonyl.

Several carbonyls of ruthenium are known, but one is of particular current interest as a catalyst in organic reactions. This is the compound whose formula was thought to be $Ru_2(CO)_9$, but work by Correy and Dahl (J.A.C.S. 83, (1961) 2203) has shown that the correct formula is probably that of a trimer, $[Ru(CO)_4]_3$. One known method of preparation involves contacting ruthenium metal or ruthenium salt with carbon monoxide at high pressure. The product, $Ru(CO)_5$ is unstable, but can be converted to $[Ru(CO)_4]_3$ with low yield.

More recently, it has been shown that a ruthenium salt of a carboxylic acid or an enolisable compound will react with carbon monoxide at high pressure to give yields of the required carbonyl of the order of 60% or greater. Unfortunately, such ruthenium salts are not readily available and their preparation from more readily available ruthenium salts is inefficient. For example, the preparation of the acetylacetonate from the readily available ruthenium thrichloride by the metathetical reaction with sodium acetylacetonate generally results in conversion of the order of 25% or less, because of the difficulty in recovering ruthenium acetylacetonate from organic solvents. Thus, the overall yield of carbonyl, calculated on the ruthenium starting material, is generally no better than about 15%.

A single stage process has now been devised for preparing triruthenium dodecacarbonyl in high yield from ruthenium trichloride or other simple ruthenium salts.

Accordingly, the present invention provides a process for the preparation of triruthenium dodecacarbonyl which comprises contacting (i) a ruthenium salt of an inorganic acid, (ii) a compound of an alkali metal or alkaline earth metal and an organic acid or an enolisable compound and (iii) a solvent, with (iv) a mixture comprising carbon monoxide and hydrogen.

As an alternative to (ii) a mixture of an alkali or alkaline earth metal and the free organic acid or enolisable compound may be used.

A suitable ruthenium salt is ruthenium trichloride, which may be in the hydrated form. Examples of organic acids are succinic, stearic, acetic, benzoic and naphthenic acids. The term "enolisable compound" includes ketones, especially β-diketones such as acetylacetone, β-diketone esters such as acetylacetic methyl ester, and naphthols. Sodium acetylacetonate is the preferred alkali metal compound; as an alternative sodium metal in the presence of acetylacetone or methanol may be used.

Solvents are most effective if they do not react with the product. Lower alcohols or amides may be used. Methanol, ethanol and dimethyl formamide are particularly suitable since the starting materials are readily soluble in these solvents. Water may be present as a co-solvent.

Molar ratios of carbon monoxide to hydrogen should be in the range 1:5 to 5:1, high yields being obtained in the range 3:1 to 1:1. If too little hydrogen is present large proportions of ruthenium carbonyl salts will be produced.

The pressure under which the reaction is carried out may range from 0 to 3000 atmospheres, though operation between 10 and and 300 atmospheres is preferred.

The reaction temperature may be between 25 and 300° C., preferably between 100 and 250° C.

In a typical preparation, a ruthenium salt and an alkali metal compound are added to an excess of solvent and the whole introduced into a pressure vessel which is then sealed. Carbon monoxide and hydrogen are introduced in the required proportions and amounts and the whole is heated to the required temperature. It is advantageous to agitate the contents of the vessel to promote the reaction.

After a period which may be up to 15 hours when operating under the preferred conditions, the vessel is cooled, vented and the contents removed. Usually some solid products are obtained which contain a high proportion of the desired carbonyl. Evaporation of the solvent may be required to increase the yield. The crude product may contain some ruthenium carbonyl salts as an impurity which may or may not be objectionable in subsequent uses.

Purification may be effected by recrystallisation from organic solvents such as benzene, acetone or petroleum ether, or by other techniques such as chromatography, or sublimation under reduced pressure. Yields, calculated on the amount of ruthenium placed in the reaction vessel, are usually better than 50%.

The invention is illustrated by the following examples.

EXAMPLE 1

15 g. of commercial ruthenium trichloride (trihydrate) and 22 g. of sodium acetylacetonate were added to 600 ml. of methanol and the whole placed in a 1 litre autoclave. The vessel was sealed and pressured up to 120 atmospheres with a mixture containing 3 moles of carbon monoxide per mole of hydrogen. The temperature was increased to 160° C. when a pressure of 160 atmospheres was attained and the vessel was rocked to agitate it for four hours.

After cooling, and venting the contents were removed and 15.9 g. of orange-brown crystals obtained by decanting the liquid. This was believed to be a mixture of $Ru_3(CO)_{12}$ together with some $[Ru(CO)_2Cl_2]_n$ or an acetylacetonate complex of ruthenium carbonyl.

Purification was effected by recrystallising from 100/120 grade petroleum ether, the yield without further work up of residues being 9.4 g. of essentially pure $Ru_3(CO)_{12}$ (75% yield on starting material $RuCl_3 \cdot 3H_2O$).

EXAMPLE 2

10 g. ruthenium trichloride trihydrate, 11.8 g. acetyl acetone and 2.7 g. sodium metal were added to 500 ml. methanol in a 1 litre autoclave. After heating with a carbon monoxide/hydrogen mixture under the conditions of Example 1, 5.0 g. of triruthenium dodecacarbonyl were obtained, equivalent to a yield of about 60%.

EXAMPLE 3

5 g. ruthenium trichloride trihydrate and 25 g. naphthenic acid which had been neutralised with sodium methoxide in methanol was made up to 200 ml. with more methanol. After heating with a carbon monoxide/hydrogen mixture and after purification under the conditions of Example 1, about 3 g. triruthenium dodecacarbonyl were obtained, (70% yield).

What we claim is:

1. A process for the preparation of tri-ruthenium dodecacarbonyl comprising reacting a liquid solution of:
   (i) a soluble ruthenium salt of an inorganic acid; and
   (ii) an alkali metal or alkaline earth metal compound of an organic acid selected from the group consisting of alkanoic acids, benzoic and naphthenic acids or of an enolizable compound selected from the group consisting of acetylacetone, acetylacetic methyl ester and naphthols
with a gaseous mixture of carbon monoxide and hydrogen, the molar ratio of carbon monoxide to hydrogen in said mixture being from 1:5 to 5:1, at a pressure from 10 to 300 atmospheres and a temperature from 100° to 250° C. and extracting tri-ruthenium dodecacarbonyl from the reaction products.

2. A process as claimed in claim 1 in which the compound of an alkali metal or alkaline earth metal and the organic acid or the enolisable compound is replaced by a mixture of an alkali or alkaline earth metal and the free organic acid or enolisable compound.

3. A process as claimed in claim 1 in which the compound of an alkali metal and an enolisable compound is sodium acetylacetonate.

4. A process as claimed in claim 1 in which the compound of an alkali metal and an organic acid is sodium naphthenate.

5. A process as claimed in claim 2 in which the alkali metal is sodium and the enolisable compound is acetylacetone.

6. A process as claimed in claim 1 in which the ruthenium salt is ruthenium trichloride.

7. A process as claimed in claim 1 in which the solvent is methanol.

8. A process as claimed in claim 1 in which the molar ratio of carbon monoxide to hydrogen is from 3:1 to 1:1.

9. A process as claimed in claim 1 in which the reaction is performed at a pressure from 10 to 300 atmospheres and at a temperature from 100° C. to 250° C.

References Cited

UNITED STATES PATENTS 3,387,932   6/1968   Pino et al. _____ 23—203

OTHER REFERENCES

Bruce et al., "A Low-pressure Synthesis of $Ru_3(CO)_{12}$," Chemical Communication, 1966, page 684.

Bruce et al., "Chemistry of the Metal Carbonyls," Journal Chemical Society (A), 1967, pp. 1238–1241.

EARL C. THOMAS, Primary Examiner